(12) United States Patent
Svein et al.

(10) Patent No.: US 7,875,691 B2
(45) Date of Patent: Jan. 25, 2011

(54) POLYETHYLENE COMPOSITION WITH IMPROVED STRESS CRACK RESISTANCE/STIFFNESS RELATION FOR BLOW MOULDING

(75) Inventors: Eggen Svein, Langangen (NO); Katrin Nord-Varhaug, Porsgrunn (NO); Geir Morten Johansen, Porsgrunn (NO)

(73) Assignee: Borealis Technology Oy, Porvoo (FI)

(*) Notice: Subject to any disclaimer, the term of this patent is extended or adjusted under 35 U.S.C. 154(b) by 266 days.

(21) Appl. No.: 12/089,263

(22) PCT Filed: Oct. 6, 2006

(86) PCT No.: PCT/EP2006/009684
§ 371 (c)(1),
(2), (4) Date: Jun. 30, 2008

(87) PCT Pub. No.: WO2007/042217
PCT Pub. Date: Apr. 19, 2007

(65) Prior Publication Data
US 2008/0269422 A1 Oct. 30, 2008

(30) Foreign Application Priority Data
Oct. 7, 2005 (EP) .................. 05021884

(51) Int. Cl.
*C08F 210/00* (2006.01)
*C08F 8/00* (2006.01)
*C08L 23/04* (2006.01)

(52) U.S. Cl. .................. 526/348; 525/191; 525/240

(58) Field of Classification Search .................. 526/348; 525/191, 240
See application file for complete search history.

(56) References Cited

U.S. PATENT DOCUMENTS

2003/0153688 A1* 8/2003 Lindahl et al. ............. 525/240

FOREIGN PATENT DOCUMENTS

| EP | 0 517 868 | 11/1995 |
|---|---|---|
| EP | 1 460 105 | 9/2004 |
| EP | 1 146 077 | 6/2006 |
| WO | WO 96/18662 | 6/1996 |
| WO | WO 97/44371 | 11/1997 |
| WO | WO 00/22040 | 4/2000 |
| WO | WO 01/23446 | 4/2001 |
| WO | WO 2004/007610 | 1/2004 |
| WO | WO 2004/048468 | 6/2004 |

OTHER PUBLICATIONS

International Search Report for International Application No. PCT/EP2006/009684.
Written Opinion for International Application No. PCT/EP2006/009684.
Heino, E.L. et al., "*Rheological characterization of polythylene fractions,*" Theor. Appl. Rheol., Proc. Int. Congr. Rheol, 11$^{th}$ (1992) 1, 360-362.
Heino, E.L., "*The influence of molecular structure of some rheological properties of polyethylene*" Annual Transactions of the Nordic Rheology Society, vol. 3, 1995.

* cited by examiner

*Primary Examiner*—Nathan M Nutter
(74) *Attorney, Agent, or Firm*—Fay Sharpe LLP

(57) ABSTRACT

The present invention relates to a polyethylene composition wherein (i) the composition has an MFR2 of 0.05 to 100 g/10 min, (ii) the environmental stress crack resistance ESCR measured according to the FNCT at 12 MPa and 23° C. in hours and the E-modulus EM measured according to ISO 527-2: 1993 satisfy the following relation: ESCR>−0.244 EM h/MPa+416 h (I).

16 Claims, No Drawings

POLYETHYLENE COMPOSITION WITH IMPROVED STRESS CRACK RESISTANCE/STIFFNESS RELATION FOR BLOW MOULDING

The present invention relates to a polyethylene composition having an improved stress crack resistance/stiffness relation, which in particular is suited for blow moulding applications, a process for blow moulding the polyethylene composition into an article, an article comprising the polyethylene composition, and to the use of the composition for blow moulding.

Polyethylene is widely used for the production of blow moulded articles, such as household industrial chemical (HIC) containers, due to its good mechanical properties including low inherent weight, high mechanical strength, high environmental stress crack resistance (ESCR), chemical resistance, long-term stability and its good processability. Typical examples for HIC applications include containers for washing-up liquid, detergent, cosmetics and automotive chemicals.

Amongst the above-mentioned properties, in particular high ESCR and, simultaneously, high stiffness are desirable. However, these properties are contradictory at least in part because, for example, it is known that ESCR improves with decreasing density whereas stiffness improves with increasing density. Furthermore, a low swell of the composition when blow moulded is desirable.

WO 01/23446 describes a polyethylene moulding composition with a multimodal molar weight distribution which comprises an ultrahigh-molecular weight polyethylene fraction, a low molecular weight ethylene homopolymer fraction and a high molecular weight ethylene copolymer fraction.

Such multimodal polyethylene resins are known to have good processability and a good ESCR/stiffness relation. However, for moulding applications, in particular for blow moulding, there is a still a need for polyethylene compositions having improved ESCR and, at the same time, good stiffness, i.e. having an optimised ESCR/stiffness relation.

It is therefore an object of the present invention to provide a polyethylene composition with an improved ESCR/stiffness relation. Furthermore, it is an object of the invention that the composition at the same time has good further mechanical properties, such as long-term stability and low swell, and good processability.

The present invention is based on the finding that such a composition must contain a fraction, usually from 1 to 20 wt %, of a copolymer of ethylene with one or more types of alpha-olefin comonomers which has a comparatively high molecular weight, usually above 500,000 g/mol.

The present invention thus provides a polyethylene composition wherein
(i) the composition has an $MFR_2$ of 0.05 to 100 g/10 min, and
(ii) the environmental stress crack resistance ESCR measured according to the full notch creep test (FNCT) at 12 MPa and 23° C. in hours and the E-modulus EM measured according to ISO 527-2:1993 in MPa satisfy the following relation:

$$ESCR \geq -0.244\ EM\ h/MPa + 416\ h \quad (I).$$

The polyethylene composition according to the invention has improved mechanical properties including an improved ESCR/stiffness relation. The E-modulus is a measure for the stiffness. In particular, the composition has an increased ESCR while maintaining e.g. good stiffness and low swell.

Preferably, the ESCR and the EM of the composition satisfy the reaction:

$$ESCR \geq -0.244\ EM\ h/MPa + 436\ h,$$

further preferred:

$$ESCR \geq -0.244\ EM\ h/MPa + 456\ h, \text{ and}$$

most preferred:

$$ESCR \geq -0.244\ EM\ h/MPa + 486\ h.$$

In a preferred embodiment, in the polyethylene composition
(iii) the ESCR measured according to the FNCT at 12 MPa and 23° C. in hours and the $MFR_2$ measured in g/10 min satisfy the following relation:

$$ESCR \geq -171.4\ MFR_2\ h/g/10\ min + 180\ h \quad (II).$$

In this preferred embodiment, also the relation between ESCR and $MFR_2$ is optimised.

Preferably, ESCR and $MFR_2$ satisfy the relation:

$$ESCR \geq -171.4\ MFR_2\ h/g/10\ min + 200\ h,$$

more preferably:

$$ESCR \geq -171.4\ MFR_2\ h/g/10\ min + 220\ h, \text{ and}$$

most preferred:

$$ESCR \geq -171.4\ MFR_2\ h/g/10\ min + 240\ h.$$

Preferably, the polyethylene composition has a melt flow rate $MFR_2$ of at least 0.1 g/10 min, more preferably at least 0.13 g/10 min, even more preferably at least 0.15 g/10 min, and most preferably at least 0.2 g/10 min.

Furthermore, the composition preferably has an $MFR_2$ of 10 g/10 min or less, more preferably 5 g/10 min or less, still more preferably 3 g/10 min or less, and most preferably 2 g/10 min or less.

Still further, preferably the polyethylene composition has an ESCR measured according to the FNCT at 12 MPa and 23° C. of 60 h or more, more preferably of 70 h or more, still more preferably of 100 h or more, and most preferably of 150 h or more.

Preferably, the composition has an E-modulus EM of 1100 MPa or higher, more preferably of 1150 MPa or higher.

In a preferred embodiment, the polyethylene composition comprises
(A) a fraction of a copolymer of ethylene with one or more alpha-olefins, with a weight average molecular weight $M_w$ of 500,000 g/mol or more.

Where ever the term "molecular weight" is used herein, the weight average molecular weight is meant. By ethylene copolymer is meant a polymer the majority by weight of which, i.e. more than 50 wt %, derives from ethylene monomer units.

Preferably, the molecular weight $M_w$ of fraction (A) is 600,000 g/mol or more. Usually, $M_w$ of fraction (A) is 2,000,000 g/mol or below, more preferably 1,500,000 g/mol or below, and most preferably 1,200,000 g/mol or below.

Furthermore, it is preferred that fraction (A) has a molecular weight distribution $M_w/M_n$ of 4 or higher, more preferably of 5 or higher.

Still further, it is preferred that fraction (A) has a molecular weight distribution $M_w/M_n$ of 15 or lower, more preferably of 10 or lower.

The comonomer contribution in fraction (A) preferably is up to 20 mol %, more preferably up to 10 mol %, still more preferably up to 6 mol % and most preferably up to 4 mol %._

Furthermore, the comonomer contribution preferably is 0.05 mol % or more, more preferably is 0.5 mol % or more, and still more preferably is 1.0 mol % or more.

Preferably, the alpha olefin comonomer is a $C_{3-20}$, especially $C_{3-10}$, comonomers, particularly singly or multiply ethylenically unsaturated comonomers, in particular $C_{3-10}$ alpha-olefins such as propene, but-1-ene, hex-1-ene, oct-1-ene, 4-methyl-pent-1-ene etc. Preferably, but-1-ene, hex-1-ene and oct-1-ene are used. But-1-ene is an especially preferred comonomer.

Fraction (A) preferably is present in the polyethylene composition in an amount of from 1 to 15 wt %, more preferred from 2 to 10 wt %.

Furthermore, the density of fraction (A) preferably is 930 kg/m³ or less, more preferably is 928 kg/m³ or less, and most preferably is 926 kg/m³ or less.

In a preferred embodiment the polyethylene composition comprises (B) a first ethylene homo- or copolymer fraction, and (C) a second ethylene homo- or copolymer fraction, which are different from fraction (A), and wherein fraction (B) has a lower average molecular weight than fraction (C).

Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

Preferably, the weight fraction of fraction (B) with regard to the total weight of fractions (B) and (C) is more than 35%, more preferably is more than 40%, still more preferably is more than 41% and most preferably is more than 42%.

Furthermore, preferably the weight fraction of fraction (B) with regard to the total weight of fractions (B) and (C) is less than 65%, more preferably is less than 60%, still more preferably is less than 58%, and most preferably is less than 55%.

In a preferred embodiment the weight average molecular weight $M_w$ of fraction (A) relative to the $M_w$ of fractions (B) and (C) is higher by a factor of at least 2, more preferably at least 2.5. Preferably, $M_w$ of fraction (A) relative to the $M_w$ of fractions (B) and (C) is higher by a factor of at most 6, more preferably of at most 5.

Fraction (B) preferably has an $MFR_2$ of 10 g/10 min or higher, more preferably of 20 g/10 min or higher, still more preferably of 50 g/10 min or higher, still more preferably of 100 g/10 min or higher, and most preferably of 200 g/10 min or higher.

Furthermore, fraction (B) preferably has an $MFR_2$ of 2000 g/10 min or lower, more preferably of 1500 g/10 min or lower, still more preferably of 1000 g/10 min or lower, and most preferably of 800 g/10 min or lower.

Fractions (B) and (C) may both be ethylene copolymers or ethylene homopolymers, although preferably at least one of the fractions is an ethylene copolymer.

Preferably, the composition comprises an ethylene homopolymer and an ethylene copolymer component.

Preferably, fraction (B) is an ethylene homo- or copolymer with a density of at least 965 kg/m³.

Where one of the components is an ethylene homopolymer, this is preferably the component with the lower molecular weight, i.e. fraction (B). However, also component (C) can be an ethylene homopolymer.

Preferably, fraction (C) is an ethylene homo- or copolymer with a density of less than 970 kg/m³, more preferably of less than 965 kg/m³.

Most preferably, fraction (C) is a copolymer. It may be noted that the term ethylene copolymer is used herein to relate to a polyethylene deriving from ethylene and one or more copolymerisable comonomers. Preferably, the copolymer component(s) of the composition of the invention will contain at least 0.01 mol %, more preferably at least 0.05 mol %, and most preferably at least 0.1 mol % of non-ethylene comonomer units. Furthermore, preferably the copolymer contains at most 5 mol % of such comonomer units, more preferably at most 2 mol %.

Preferred ethylene copolymers employ alpha-olefins (e.g. $C_{3-12}$ alpha-olefins) as comonomers. Examples of suitable alpha-olefins include but-1-ene, hex-1-ene and oct-1-ene. But-1-ene is an especially preferred comonomer.

Furthermore, the composition preferably has a SHI(2.7/210) of 20 or more.

The density of the composition preferably is 945 kg/m³ or higher, more preferably 950 kg/m³ or higher, and most preferably higher than 953 kg/m³.

Preferably, the composition of the invention has a Charpy impact strength (23° C.) of 4 kJ/m² or more, still more preferably 5 kJ/m² or more and most preferably 6 kJ/m² or more.

Furthermore, the composition preferably has a molecular weight distribution MWD measured as ratio of $M_w$ to $M_n$ is higher than 4, more preferably is higher than 10, and most preferably is higher than 15.

Usually, the MWD of the composition is smaller than 35.

Usually, the compositions have a Charpy impact strength (23° C.) of up to 10 kJ/m², more preferably up to 15 kJ/m², and most preferably of up to 20 kJ/m².

Furthermore, preferably the compositions have a Charpy impact strength (−20° C.) of 3 kJ/m² or more, more preferably of 3.5 kJ/m².

Usually, the compositions have a Charpy impact strength (−20° C.) of up to 6.5 kJ/m², more preferably of up to 10 kJ/m².

Furthermore, preferably, the polyethylene composition has a die swell rate of 1.8 or lower, more preferably of 1.7 or lower.

The polyethylene composition may also contain minor quantities of additives such as pigments, nucleating agents, antistatic agents, fillers, antioxidants, processing aids, etc., generally in amounts of up to 10% by weight, preferably up to 5% by weight.

Fraction (A) of the polyethylene composition may be produced in any conventional ethylene homo- or copolymerisation method, e.g. in gas phase, slurry phase, liquid (bulk) phase using conventional reactors, such as loop reactor, gas phase reactor, semi-batch or batch reactor.

Preferably, fraction (A) is produced in a slurry reaction, preferably in a loop reactor, or in a gas phase reaction.

The polyethylene composition of the invention may be produced by blending fraction (A) with a polyethylene base resin, either mechanically, e.g. by in-line compounding, or in-situ.

By "in-situ blending", production of a multimodal polymer is meant wherein the fractions are produced either simultaneously in one reaction stage (e.g. by using two different catalysts), and/or are produced in a multistage process. A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, stirred tank reactors, batch reactors etc. (see for example WO97/44371 and WO96/18662).

In the preferred embodiment wherein the composition comprises fractions (A), (B) and (C), it is preferred that fractions (A), (B) and/or (C) are produced in a multistage reaction.

Further in one preferred embodiment, the composition is produced so that at least one of fractions (B) and (C), preferably (C), is produced in a gas-phase reaction.

Further preferred, one of the fractions (B) and (C) of the polyethylene composition, preferably fraction (B), is produced in a slurry reaction, preferably in a loop reactor, and one of the fractions (B) and (C), preferably fraction (C), is produced in a gas-phase reaction.

In an alternative preferred embodiment, components (B) and (C) are produced in two stirred tank reactors.

Accordingly, it is preferred that fractions (B) and (C) of the polyethylene resin are produced in different stages of a multistage process. Further, it is preferred that also fraction (A) is produced in a stage of said multistage process.

Preferably, the multistage process comprises at least one gas phase stage in which, preferably, fraction (C) is produced.

It is also possible to produce components (A) and (C) or (A) and (B), preferably (A) and (C) in the same reaction stage, preferably in a gas phase reaction, by adding a second catalyst to said reaction stage with high Mw capability and appropriate comonomer incorporation capability.

Further preferred, fraction (C) is produced in a subsequent stage in the presence of fraction (B) which has been produced in a previous stage. Still further, it is preferred that fraction (A) is produced in a stage preceding the stages in which fraction (B) and (C) are produced.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene resin.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst.

The Ziegler-Natta catalyst further preferably comprises a group 4 (group numbering according to new IUPAC system) metal compound, preferably titanium, magnesium dichloride and aluminium.

In the production of the resin, preferably a compounding step is applied, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The present invention further concerns a blow moulded article comprising the polyethylene composition as described hereinbefore, a process for preparing the blow moulded article which comprises blow moulding of the composition into an article, and to the use of the polyethylene composition for blow moulding.

EXPERIMENTAL AND EXAMPLES

1. Definitions and Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by the opposite end of the "population".

b) Density

All densities are measured according to ISO 1183/D.

c) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

d) Shear Thinning Index SHI

Dynamic rheological measurements were carried out with a rheometer, namely Rheometrics RDA-II QC, on compression moulded samples under nitrogen atmosphere at 190° C. using 25 mm diameter plates and plate geometry 1.2 mm gap. The oscillatory shear experiments were done within the linear viscosity range of strain at frequencies from 0.05 to 300 rad/s (ISO 6721-1).

The values of storage modulus (G'), loss modulus (G") complex modulus (G*) and complex viscosity (eta*) were obtained as a function of frequency (omega). Eta(100 rad/s) is used as abbreviation for the complex viscosity at 100 rad/sec shear rate.

Shear thinning index (SHI), which is correlating with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11$^{th}$ (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

SHI value is obtained by calculating the complex viscosities $eta_{(2.7)}$ and $eta_{(210)}$ at a constant shear stress of 2.7 kPa and 210 kPa, respectively. The shear thinning index SHI(2.7/210) is defined as the ratio of the two viscosities $eta_{(2.7)}$ and $eta_{(210)}$.

The definitions and measurement conditions are also described in detail on page 8 line 29 to page 11, line 25 of WO 00/22040.

e) Charpy Impact Strength

Charpy impact strength was determined according to ISO 179:2000 on V-notched samples at 23° C. (Charpy impact strength (23° C.)) and −20° C. (Charpy impact strength (−20° C.)) on compression moulded samples multipurpose type B (ISO 3167), with a thickness of 4 mm. Average cooling rate was 15 K/min (ISO 1872-2).

f) Die Swell Rate

Die swell rate was measured at an extrudate length of 5 cm and the infrared camera is measuring the extrudate 3.2 cm under the die on a RH10 Advanced Capillary Rheometer from Malvern according to ISO 11443: 1995 at 190° C. The piston diameter was 12 mm and the piston speed 2 mm/min. The die diameter was 1 mm and the die length 5 mm. The die inlet temperature was 180° C., and the preheating was 10 minutes.

g) ESCR

ESCR was measured according to the full notch creep test method (FNCT) according to ISO/DIS 16770.3 at 23° C. and 12 MPa stress with a notch depth of 1 mm and specimen dimensions 123 mm×6 mm×20 mm. The solvent used was 2 vol % Igepal CO-630 in deionized water. Compression moulded samples.

h) Stiffness

As a measure for the stiffness, the E-modulus of the compositions was measured on compression moulded samples according to ISO 527-2:1993. E-modulus (tensile modulus) was measured at a speed of 1 mm/min.

2. Polyethylene Compositions a) Ultra-High Molecular Weight Fractions

Four ultra-high molecular weight (UHMW) ethylene polymers have been prepared in the following manner:

For the preparation of the compositions according to the invention, two UHMW copolymers of ethylene and 1-butene (UHMW1, UHMW2), and for the preparation of the comparative compositions (see below) two ethylene homopolymers (UHMW3 and UHMW4) have been produced.

Ultra-high molecular weight (UHMW) ethylene polymers were prepared in the following manner:

| | |
|---|---|
| Reactor: | stainless steel reactor, 2 l |
| Reactor medium: | iso-Butane (900 ml) |
| Inert gas: | Nitrogen |
| Temperature: | 85° C. |
| Comonomer: | 1-Butene (where applicable) |
| Hydrogen addition: | Batchwise |
| Ethylene feed: | Batchwise and continuous |
| Comonomer addition: | Batchwise and continuous |
| Al/Ti (mol/mol): | 25 |

The polymerisations were carried out in a stainless steel reactor equipped with an anchor stirrer. The polymerisations were done in i-butane slurry at 85° C. at a total pressure of 22.2 bar.

As a catalyst, Lynx 200™, a $MgCl_2$ supported titanium containing catalyst available from Engelhard Corporation Pasadena, U.S.A.

TEAL was used as cocatalyst. An Al/Ti (mol/mol) ratio of 25 was used. The comonomer was 1-butene. Hydrogen was added as one batch at the outset of reaction. Ethylene was added continuously during the polymerisation to maintain a constant reactor pressure. 1-Butene was added (where applicable) both as a batch at the outset of reaction, and cascaded with ethylene during polymerisation.

After polymerisation was completed, the reactor was vented and the content was exposed to air.

The properties of these polymers are shown in Table 1.

TABLE 1

| Polymer | $M_w$ | $M_n$ | MWD | amount of butene-1 (mol %) | density (kg/m³) | Polymerisation conditions | | | | |
|---|---|---|---|---|---|---|---|---|---|---|
| | | | | | | Temp (° C.) | P (bar) | Hydrogen | 1-Bu (wt.-% vs ethylene) | 1-Bu (batch, g) |
| UHMW1 | 695000 | 125000 | 5.6 | 1.5 | 924.3 | 85 | 22.2 | 0.02 | 15 | 3 |
| UHMW2 | 1070000 | 155000 | 6.9 | 1.5 | 920.9 | 85 | 22.2 | 0 | 15 | 3 |
| UHMW3 (Comp.) | 720000 | 125000 | 5.8 | 0 | 945 | 85 | 22.2 | 0.11 | 0 | 0 |
| UHMW4 (Comp.) | 980000 | 180000 | 5.4 | 0 | 941.9 | 85 | 22.2 | 0.07 | 0 | 0 | b) Compositions

In Examples 1 to 4, 5 wt % of UHMW polymers, A1 to A4, respectively, were mechanically blended with the resin in Example 5. Blends were compounded on a small scale twin-screw Prism 24 mm extruder two times with a melt temperature of 190 to 230° C. (logged process data). 1000 ppm of Irganox B561 was added to the blends.

In Example 5, the pure polyethylene base resin comprising components (B) and (C) without addition of any UHMW component is given. This is BS 2581 commercially available from Borealis.

The properties of the obtained compositions are given in Table 2.

TABLE 2

| Composition | density (kg/m³) | MFR₂ (g/10 min) | die swell rate | SHI (2.7/210) | Charpy Impact +23° C. (kJ/m²) | Charpy Impact −20° C. (kJ/m²) | ESCR (h) | E-modulus (MPa) | −0.244 EM + 416 (h) | −171.4 MFR₂ + 180 (h) |
|---|---|---|---|---|---|---|---|---|---|---|
| Example 1 | 955.6 | 0.2 | 1.6 | 45 | 12 | 6.5 | 240 | 1100 | 147.6 | 145.7 |
| Example 2 | 955.6 | 0.18 | 1.6 | 51 | 12 | 6.5 | 220 | 1180 | 128.1 | 149.1 |
| Example 3 (Comp.) | 956.2 | 0.2 | 1.57 | 43 | 13 | 6.9 | 125 | 1150 | 135.4 | 145.7 |
| Example 4 (Comp.) | 957.7 | 0.19 | 1.56 | 43 | 13 | 7.7 | 115 | 1160 | 133.0 | 147.4 |
| Example 5 (Comp.) | 956.1 | 0.32 | 1.6 | 42 | 9.3 | 5.2 | 95 | 1140 | 137.8 | 125.2 |
| Unimodal 1 (Comp.) | 960.0 | 0.5 | 1.62 | | 7.2 | | 46 | 1330 | 91.5 | 94.3 |
| Unimodal 2 (Comp.) | 963.9 | 0.59 | 1.95 | 51 | 7.6 | | 7.6 | 1470 | 57.3 | 78.9 |
| Unimodal 3 (Comp.) | 959.1 | 0.18 | 1.74 | 93 | 12.2 | | 43 | 1230 | 115.9 | 149.1 |

The invention claimed is:

1. A polyethylene composition comprising:
  (A) a fraction of a copolymer of ethylene with one or more alpha-olefins, with a weight average molecular weight $M_w$ of 500,000 g/mol or more, the copolymer having a comonomer content from 1 to 20 mol %;
  (B) a first ethylene homo- or copolymer reaction; and
  (C) a second ethylene homo- or copolymer fraction;
  wherein fractions (B) and (C) are different from fraction (A), and wherein fraction (B) has a lower average molecular weight than fraction C; and
  wherein:
  (i) the composition has an MFR₂ of 0.05 to 100 g/10 min, and
  (ii) the environmental stress crack resistance ESCR measured according to the FNCT at 12 MPa and 23° C. in hours and the E-modulus EM measured according to ISO 527-2:1993 satisfy the following relation:

ESCR≧−0.244 EM h/MPa+456 h.

2. A polyethylene composition according to claim 1, wherein the stress crack resistance ESCR measured according to FNCT at 12 MPa and 23° C. in hours and the MFR₂ in g/10 min satisfy the following relation:

ESCR≧−171.4 MFR₂ h/g/10 min+180 h.

3. A polyethylene composition according to claim 1, wherein fraction (A) is present in the composition in an amount of from 1 to 20 wt %.

4. A polyethylene composition according to claim 1, wherein fraction (A) has a density of 930 kg/m³ or less.

5. A polyethylene composition according to claim 1, wherein the $M_w$ of fraction (A) is higher than the $M_w$ of fraction (B) and (C) by a factor of from 2 to 6.

6. A polyethylene composition according to claim 1, wherein at least one of fractions (A), (B) and (C) are produced in a multistage reaction.

7. A polyethylene composition according to claim 1 wherein the composition has a density of 945 kg/m³ or higher.

8. A polyethylene composition according to claim 1 wherein the composition has a die swell ratio of 1.8 or lower.

9. A blow moulded article comprising a polyethylene composition, wherein the polyethylene composition comprises:
  (A) a fraction of a copolymer of ethylene with one or more alpha-olefins, with a weight average molecular weight $M_w$ of 500,000 g/mol or more, the copolymer having a comonomer content from 1 to 20 mol %;
  (B) a first ethylene homo- or copolymer fraction; and
  (C) a second ethylene homo- or copolymer fraction;
  wherein fractions (B) and (C) are different from fraction (A), and wherein fraction B has a lower average molecular weight than fraction (C); and
  wherein:
  (i) the composition has an MFR₂ of 0.05 to 100 g/10 min, and
  (ii) the environmental stress crack resistance ESCR measured according to the FNCT at 12 MPa and 23° C. in hours and the E-modulus EM measured according to ISO 527-2:1993 satisfy the following relation:

ESCR≧−0.244 EM h/MPa+456 h.

10. A process for preparing a blow moulded article, wherein the process comprises:
  blow moulding a polyethylene composition to form the article, wherein the polyethylene composition comprises:
(A) a fraction of a copolymer of ethylene with one or more alpha-olefins, with a weight average molecular weight $M_w$ of 500,000 g/mol or more, the copolymer having a comonomer content from 1 to 20 mol %;
(B) a first ethylene homo- or copolymer fraction; and
(C) a second ethylene homo- or copolymer fraction;
wherein fractions (B) and (C) are different from fraction (A), and wherein fraction (B) has a lower average molecular weight than fraction (C); and
wherein:
(i) the composition has an $MFR_2$ of 0.05 to 100 g/10 min, and
(ii) the environmental stress crack resistance ESCR measured according to the FNCT at 12 MPa and 23° C. in hours and the E-modulus EM measured according to ISO 527-2:1993 satisfy the following relation:

ESCR≧−0.244 EM h/MPa+456 h.

11. A polyethylene composition according to claim 3 wherein fraction (A) has a density of 930 kg/m³ or less.

12. A polyethylene composition according to claim 1, wherein fraction (B) is a homopolymer and fraction (C) is a copolymer, fraction (C) having a comonomer content of at least 0.01 mol %.

13. A polyethylene composition according to claim 1, wherein fraction (B) has a density of at least 965 kg/m³ and fraction (C) has a density of less than 970 kg/m³.

14. A polyethylene composition according to claim 1, wherein the weight of fraction (B) with regard to the total weight of fractions (B) and (C) is more than 35% and less than 65%.

15. A polyethylene composition according to claim 1, wherein fraction (A) is from 2 to 10 weight percent of the polyethylene composition.

16. A polyethylene composition according to claim 1, wherein the environmental stress crack resistance ESCR and the E-modulus EM satisfy the following relation:

ESCR≧−0.244 EM h/MPa+486 h.

* * * * *